No. 856,474. PATENTED JUNE 11, 1907.
G. F. KRIESEL.
CHEESE CUTTER.
APPLICATION FILED OCT. 8, 1906.
3 SHEETS—SHEET 1.
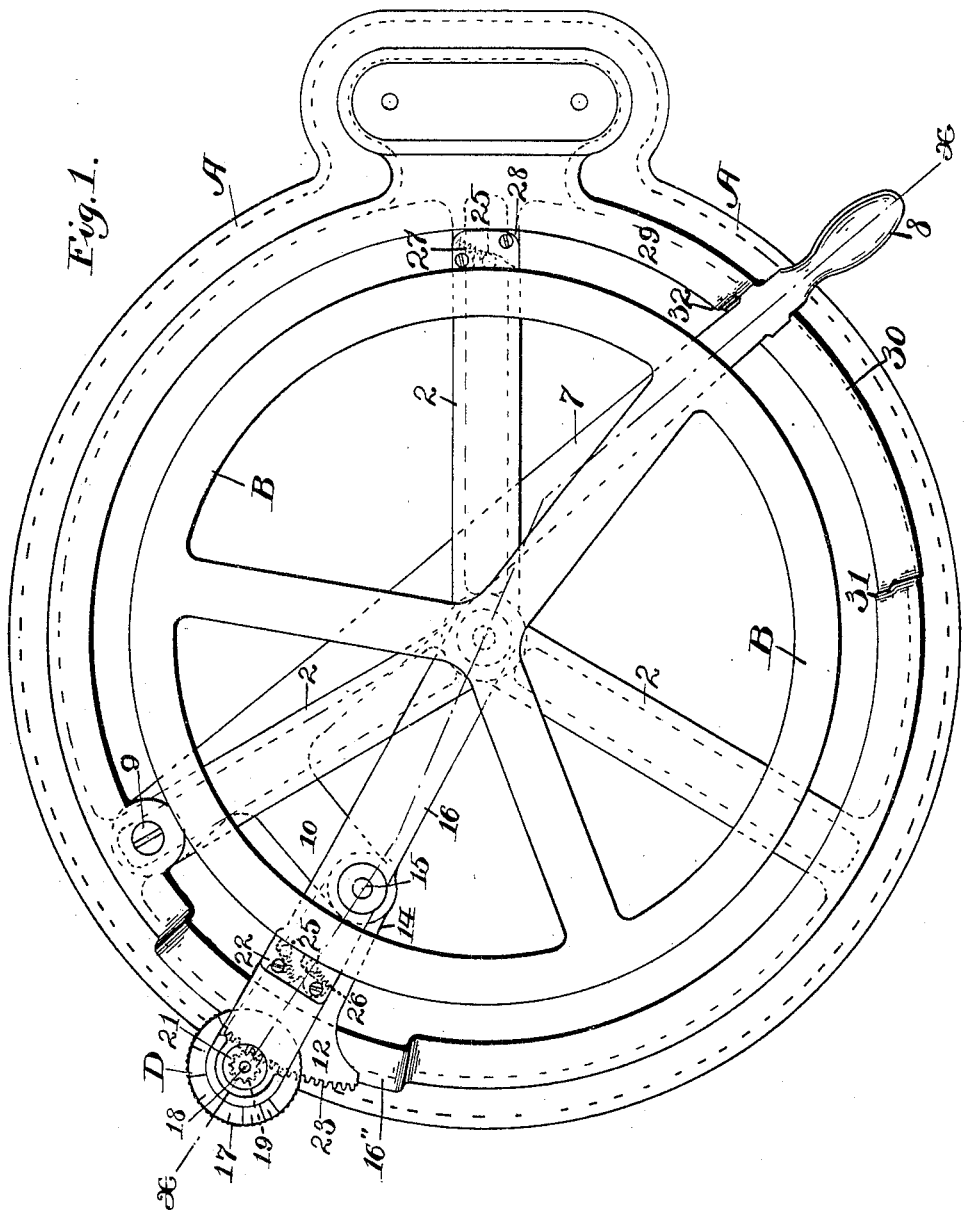
Witnesses:
H. Fischer.
M. G. Lichtscheidl
Inventor;
Gustave F. Kriesel,
by: John E. Stryker
Attorney.

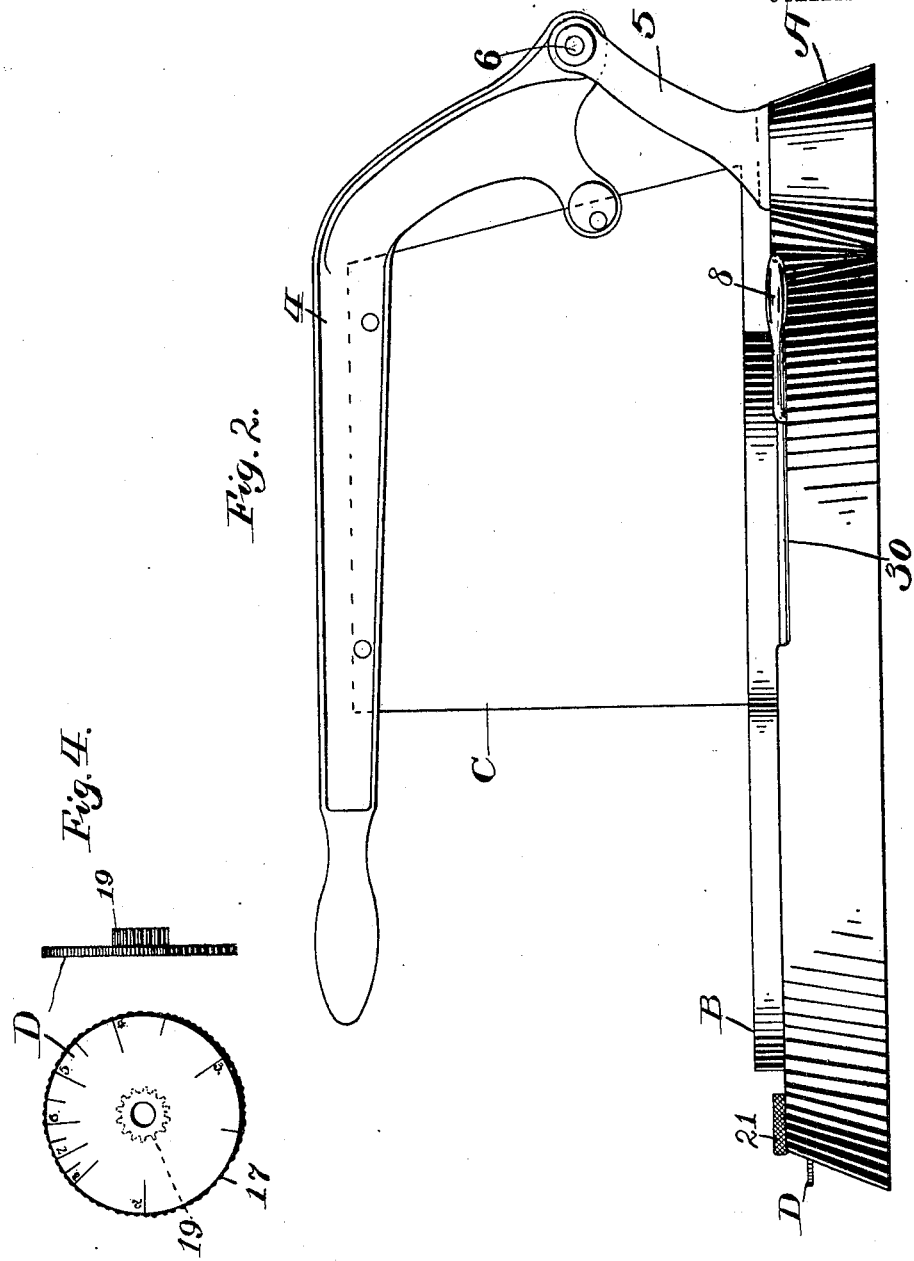

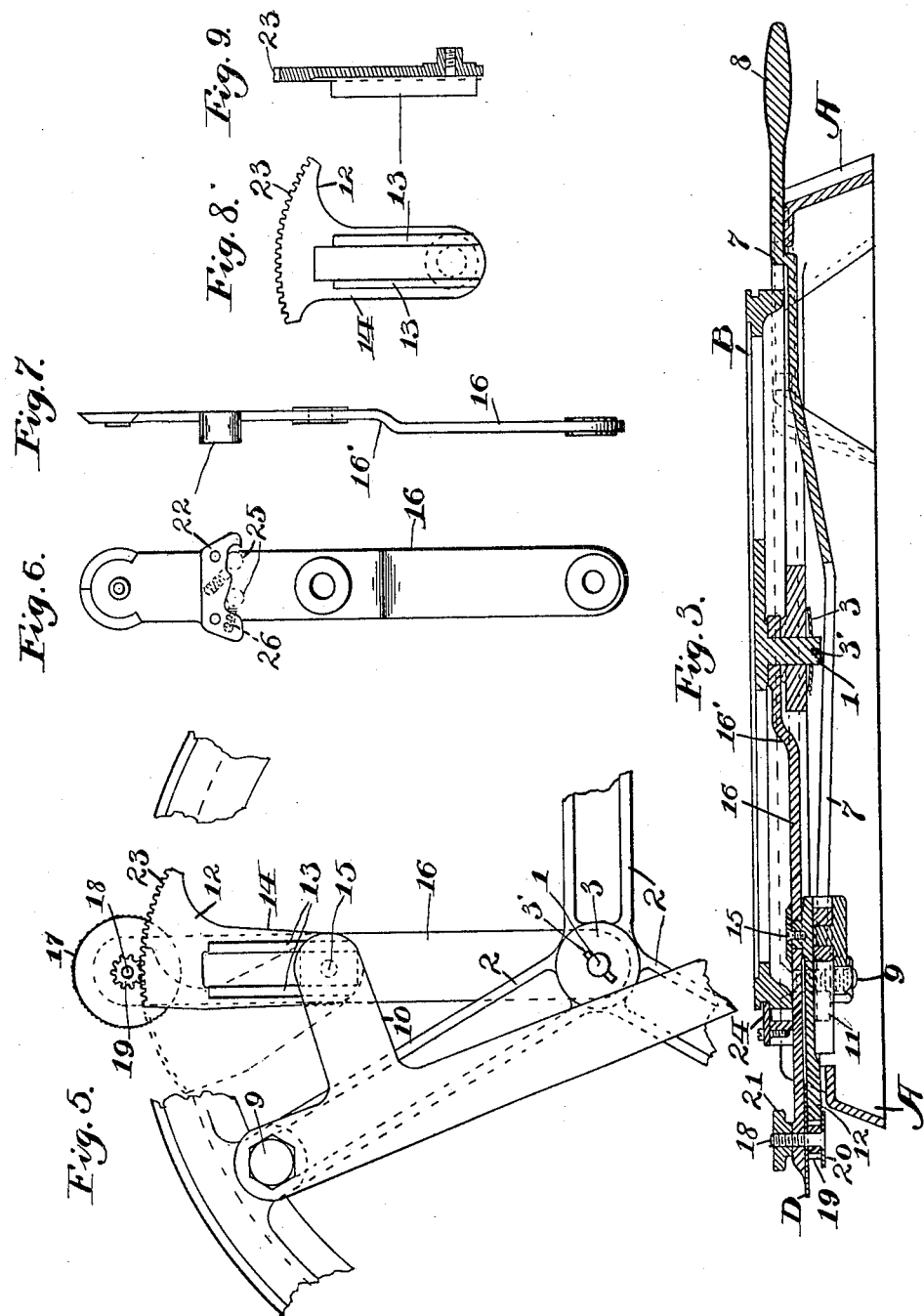

UNITED STATES PATENT OFFICE.

GUSTAVE F. KRIESEL, OF MINNEAPOLIS, MINNESOTA.

CHEESE-CUTTER.

No. 856,474.  Specification of Letters Patent.  Patented June 11, 1907.

Application filed October 8, 1906. Serial No. 337,859.

*To all whom it may concern:*

Be it known that I, GUSTAVE F. KRIESEL, a citizen of the United States, residing at Minneapolis, in the county of Hennepin and State of Minnesota, have invented a new and useful Improvement in Cheese-Cutters, of which the following is a specification.

My invention relates to improvements in cheese cutters of that class which is adapted to divide a cheese of any ordinary size and weight into a pre-determined number of segments.

Its object is to produce simple, economical and accurate means for dividing the cheese into pieces convenient for sale and of known value.

The invention consists of a rotary cheese support, adjustable means for revolving the support step by step, adjusting means for fixing the aliquot portion of the cheese to be cut at each stroke, means for co-ordinating the movements of the parts, and a severing knife, said elements being constructed and arranged as hereinafter described and claimed.

In the drawings, Figure 1 is a plan view of my improved cheese cutter; Fig. 2 is an elevation of the same; Fig. 3 is a section taken on the line X—X of Fig. 1; Fig. 4 is a detail showing the adjusting dial; Fig. 5 is a detail showing the arrangement of the adjusting mechanism; Fig. 6 is a plan of the clutch lever; Fig. 7 is an elevation of the same; Fig. 8 is a plan of the adjusting arm, and Fig. 9 is a central section of the same.

Upon the base A the rotary cheese carrier B is centrally journaled by means of the pivot pin 1. This carrier has its bearing on the arms 2 of the base A and is held in frictional engagement therewith by means of the dished washer 3 bound by the cotter pin 3'. The knife C is carried upon the lever 4 which is fixed as to horizontal motion in the bifurcated standard 5, the latter being attached to the base A. Said lever 4 is journaled in the standard 5 by means of the pintle 6 to permit vertical movement. Thus the knife travels in a fixed vertical plane which intersects the surface of the carrier B radially and will make a radial incision in a cheese when placed upon said carrier.

The mechanism for moving the carrier B under the knife comprises an operating lever 7 having a handle 8 upon its free end and pivoted to its opposite end to permit horizontal movement, by means of the bolt 9; in the base A. The lever 7 is provided with an off-set 10 carrying a pivoted block 11, the purpose of which is to form a sliding connection between the operating lever and the clutch lever (hereinafter described). To connect with the pivoted block 11, the adjusting arm 12 is furnished with guides 13 upon its shank 14, the block sliding between said guides. The arm 12 is pivotally supported by the bolt 15 on the lower side of the clutch lever 16 which swings on the pin 1 in the center of the frame A. A downward bend in the clutch lever at 16' and a depression in the rim of the base A at 16'' permit the arm 12 to oscillate below the level of the carrier B.

Upon the outer end of the clutch lever the dial D is placed and upon the same lever the ball clutch (hereinafter described) is carried between the dial and the point where the arm 12 is pivoted to the clutch lever. The dial D comprises a milled wheel 17 bearing upon its face numerals indicating the various total valuations at which a cheese may be sold. This dial is journaled upon the clutch lever 16 by means of the bolt 18. To the lower side of the dial a gear wheel 19 is centrally and rigidly attached, being separated from the head of the bolt 18 by the washer 20. Upon the upper end of the bolt 18 a milled set nut 21 is threaded which permits the disk and its gear wheel to be rigidly fixed or to revolve upon the end of the clutch lever. When the nut 21 is set the clutch lever and adjusting arm become one continuous lever, whose thrust imparts motion to the cheese carrier, by means of ball clutch 22. The toothed segment 23 of the arm 12 meshes with the gear wheel 19.

By loosening the set nut and turning the milled disk, the angle of the arm 12 with reference to the lever 16 may be changed, which change in turn alters the position of the point upon the lever 16 to which the operation of the lever 7 imparts motion, and thus the thrust of the lever 16 may be increased or decreased at will. Upon this clutch lever 16 a plate 24 is provided which retains the balls in the clutch 22. This clutch is of ordinary construction, adapted and positioned to make a frictional engagement with the edge of the revolving carrier B and when the operating lever 7 is moved toward the left, to cause the revolution of said carrier, while releasing it when the lever is moved toward the right. The balls 25 of this clutch are held in place by the spiral springs 26. To make more certain the elimination of the reverse movement of the carrier a second ball clutch 27 may be placed on the base A at 28 to engage the edge of the carrier B. The rim 29 of the base A is cut away to form a slot 30 over which the handle 8 of the operating lever is placed, and the movement of this lever is limited at both ends of its stroke by the fixed stops 31 and 32 formed at the ends of the slot. Thus the stroke of this lever is always the same and there is no opportunity for inaccuracy of action, as is the case when one or both the stops are adjustable.

In operation the total retail valuation of a cheese to be placed upon the cutter is determined by the vender and the dial is turned to indicate such total valuation, the graduations upon the dial being arranged inversely relative to the arc to be covered by the cheese carrier at each stroke of the operating lever. This turning of the dial sets the adjusting mechanism through the meshing of the gear wheel 19 with the toothed segment 23 on the arm 12. When the dial has been clamped by the set nut 21 to register the total valuation of the cheese, the thrust of the levers upon the carrier B is fixed and the adjusting mechanism need not again be touched until the entire cheese has been cut and sold. The salesman has then only to push the operating lever to the left the full distance permitted by the fixed stops to move the carrier the number of degrees necessary to pass under the knife an aliquot segment of the cheese which shall have a sale value proportionate to the total value of the cheese. Thus the minimum piece of cheese to be cut is usually fixed at five cents worth. If larger amounts are required, the stroke of the lever is repeated to cause further revolution of the carrier and multiply by the number of the strokes of the lever the amount which passes under the knife at one stroke.

The knife is operated vertically by means of the lever 4, as is usual in cheese cutters of this class, to cut the segment of cheese moved under the knife as above described.

Having described my invention, what I claim as new and desire to protect by Letters Patent is:—

1. In a cheese cutter, the combination with a rotary carrier, of a system of levers provided with a friction clutch for engaging the carrier, and a graduated dial, said dial being geared to the levers and adapted to fix the thrust of the same upon the rotary carrier.

2. In a cheese cutter, the combination with a rotary carrier, of an operating lever, fixed stops for limiting the movement of said lever, a graduated adjusting dial, a clutch lever in sliding connection with the operating lever, said clutch lever being provided with an arm having a toothed segment for engaging the dial and a friction clutch for engaging the rotary carrier.

3. In a cheese cutter the combination of a rotary carrier, an operating lever having a fixed stroke, a clutch lever having sliding engagement with the operating lever and provided with a clutch for the carrier, said clutch lever being jointed for the purpose of varying the thrust of the clutch on the carrier.

4. In a cheese cutter, the combination of a rotary cheese carrier, an operating lever, adjusting means consisting of a centrally journaled lever frictionally engaging the carrier and provided with a pivoted arm, a slidable connection between the operating lever and said arm, and a graduated dial geared to said pivoted arm and adapted to regulate and fix the thrust of the operating lever.

5. In a cheese cutter, the combination of a rotary cheese carrier, a reciprocating operating lever having a constant thrust, means for connecting said lever with the carrier consisting of a centrally journaled lever carrying an adjusting arm and frictionally engaging the carrier, a slidable connection between the operating lever and said arm, and a graduated dial geared to the arm and adapted to regulate and fix the thrust of the centrally journaled lever.

6. A cheese cutter, comprising a revolving carrier, a dial upon which the gross value of the cheese is indicated, a jointed lever, one member of which engages the cheese carrier while the other is provided with teeth adapted to engage the dial by which its thrust is regulated, means for setting the dial to indicate varying aliquot segments of the cheese, an operating lever having a fixed thrust, and means for slidably connecting said levers.

7. A cheese cutter, comprising, a circular frame, a knife vertically pivoted in said frame, a rotary carrier horizontally pivoted in said frame, an operating lever, a clutch lever, means for slidably connecting said levers, an adjusting arm pivoted on the clutch lever at one end and formed with a toothed segment at the other, means for fixing the angle of the arm to the clutch lever, a scale dial geared to said toothed segment and fixed stops for limiting the movement of the operating lever at both ends of the stroke.

8. A cheese cutter, comprising a frame, a rotary carrier in frictional contact with the frame, and means for revolving said carrier step by step, said means comprising an operating lever having a fixed stroke, a ball clutch adapted to frictionally engage the carrier, a jointed clutch lever upon one member of which said clutch is mounted, and slidable connections between the operating lever and second member of the clutch lever.

9. A cheese cutter, comprising a frame, a carrier pivoted upon the frame and in spring contact therewith, an operating lever, adjusting means consisting of a centrally journaled lever engaging the carrier and provided with a pivoted arm, a sliding connection between the operating lever and said arm, and a graduated dial pivoted upon the outer end of the adjusting lever, geared to the arm and adapted to regulate and fix the thrust of the operating lever.

10. A cheese cutter, comprising, a circular frame, a knife vertically pivoted in said frame, a rotary carrier horizontally pivoted in said frame, an operating lever, a clutch lever, means for slidably connecting said levers, an adjusting arm pivoted on the clutch lever, a scale dial to which said arm is geared, for determining the angle between the adjusting arm and clutch lever and means for securing said dial in position when adjusted, whereby the degree of revolution of the carrier at each stroke of the operating lever may be determined.

11. A cheese knife, in combination with a rotary carrier, an operating lever, fixed stops for limiting the movement of said lever and a graduated adjusting dial adapted to predetermine the thrust of the operating lever upon the carrier by the following means, viz.: a clutch lever, slidably connected with the operating lever, said clutch lever being provided with a pivoted arm formed with a toothed segment for engaging the dial and a clutch for engaging the rotary carrier.

In testimony whereof I have signed my name to this specification in the presence of two subscribing witnesses.

GUSTAVE F. KRIESEL.

Witnesses:
M. G. LICHTSCHEIDL,
W. H. WILLIAMS.

Correction in Letters Patent No. 856,474.

It is hereby certified that in Letters Patent No. 856,474, granted June 11, 1907, upon the application of Gustave F. Kriesel, of Minneapolis, Minnesota, for an improvement in "Cheese-Cutters," an error appears in the printed specification requiring correction, as follows: In line 55, page 1, the word "to," first occurrence, should read *at;* and that the said Letters Patent should be read with this correction therein that the same may conform to the record of the case in the Patent Office.

Signed and sealed this 30th day of July, A. D., 1907.

[SEAL.]                                                    C. C. BILLINGS,

*Acting Commissioner of Patents.*